United States Patent [19]

Prillard

[11] Patent Number: 4,981,348

[45] Date of Patent: Jan. 1, 1991

[54] VANITY MIRROR CASSETTE FOR A SUN VISOR, IN PARTICULAR IN A CAR

[75] Inventor: Charles Prillard, Rupt/Moselle, France

[73] Assignee: Rockwell Automotice Body Systems, Paris, France

[21] Appl. No.: 532,335

[22] Filed: Jun. 1, 1990

[30] Foreign Application Priority Data

Jun. 6, 1989 [FR] France ................................ 89 07473

[51] Int. Cl.[5] .............................................. G02B 7/18
[52] U.S. Cl. .................................... 350/606; 362/136; 296/97.5
[58] Field of Search ........................ 350/600, 606, 631; 248/466; 296/97.5; 362/83.1, 135, 136

[56] References Cited

U.S. PATENT DOCUMENTS

| 4,000,404 | 12/1976 | Marcus | 296/97.5 |
| 4,491,899 | 1/1985 | Fleming | 296/97.5 |
| 4,652,982 | 3/1987 | Flowerday | 362/136 |
| 4,655,498 | 4/1987 | Panzaer et al. | 296/97.5 |
| 4,796,944 | 1/1989 | Lobanoff et al. | 296/97.5 |
| 4,830,424 | 5/1989 | Svensson | 296/97.5 |
| 4,909,562 | 3/1990 | Sakuma et al. | 296/97.5 |
| 4,947,296 | 8/1990 | Takeuchi et al. | 362/135 |

*Primary Examiner*—Bruce Y. Arnold
*Assistant Examiner*—J. P. Ryan
*Attorney, Agent, or Firm*—Mark T. Basseches

[57] ABSTRACT

The cassette has a pivoting flap which covers the mirror and which may be fixed in an open position or in a closed position. In order to facilitate assembling the flap on the cassette, hinge stubs are formed on the flap and the cassette has a slot through which the flap is inserted from the rear face of the cassette. The flap is held in place by a bracket fixed to the rear face of the cassette and constituting a spring forming a fixed stop element that co-operates with flats formed on the flat close to the pivot axis.

7 Claims, 3 Drawing Sheets

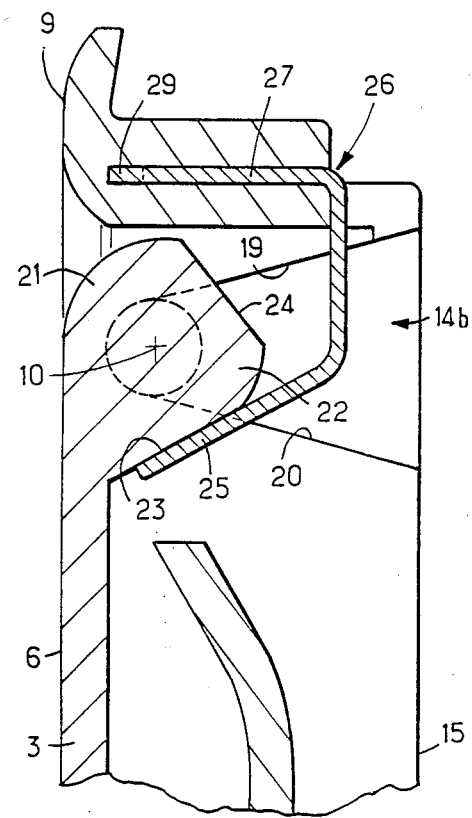
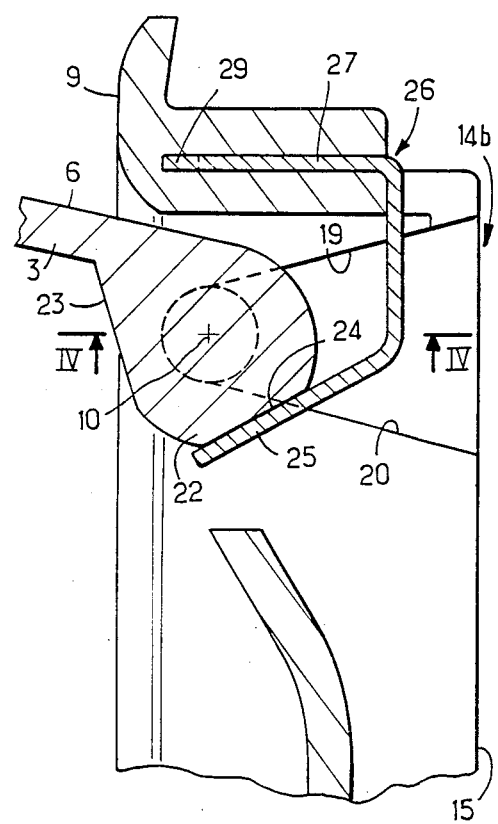
FIG. 5  FIG. 6
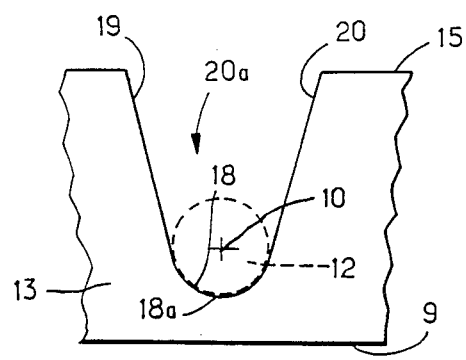
FIG. 7

VANITY MIRROR CASSETTE FOR A SUN VISOR, IN PARTICULAR IN A CAR

The invention relates to a vanity mirror cassette for a sun visor, the cassette comprising a flap which is hinged to the cassette in such a manner as to be capable of pivoting between a closed position in which the flap covers the mirror, and an open position in which the mirror is uncovered, with the flap being locked in its open and closed positions by stop devices constituted by a fixed stop element formed on the cassette and a moving stop element that moves with the flap.

BACKGROUND OF THE INVENTION

German published patent application DE-OS-3 703 511 describes a mirror cassette on which the hinge between the flap and the cassette is provided by stubs mounted to slide axially in a bore formed on the flap and co-operating with cavities constituting bearings provided in corresponding positions on the cassette. The flap is locked in the open position and in the closed position by means of co-operating projections formed concentrically with the pivot axis, one of them being fixed and formed on the cassette while the other is formed on the outer end of the corresponding stub. A compression spring is provided so that the projection on the stub is firmly engaged with the corresponding projection on the cavity.

The drawback of this prior cassette is that its various parts are difficult to make and assemble. The bores of the flap and the cavities constituting bearings require retractable cores to be provided in the molds used for manufacturing the cassette and the flap, thereby increasing the cost of the molds and reducing manufacturing throughput. In addition, it turns out to be particularly difficult and laborious to incorporate the compression spring since it must be mounted in the compressed state.

French patent application No. 88 04 457 describes another cassette in which the hinge stubs are formed on the side edges of the cassette and co-operate with corresponding cavities provided on the edges of the flap.

This cassette suffers from the drawbacks firstly that the mold for making the flap requires retractable cores in order to form the bearing-forming cavities, and secondly when the flap is mounted on the housing, one of the stubs needs to be inserted in the corresponding cavity, after which the flap needs to be resiliently deformed so as to force the other stud into its cavity, and this can lead to breakages, either of the flap, or else of a stub. The smaller and stiffer the flap, the greater the difficulty encountered during assembly.

A mirror cassette is commercially available in which the flap includes cavities forming bearings and the cassette has stubs which co-operate with the bearings, and in which the moving stop element for the flap is constituted by a V-shaped tab provided on the edge of the flap adjacent to the alignment of the cavities, and the fixed stop element on the cassette is constituted by a spring blade applying a force on the flap urging it towards the front face of the housing.

This prior cassette suffers from the same drawbacks as the cassette described in French patent application No. 88 04 547.

The object of the present invention is to mitigate these drawbacks and to provide a mirror cassette of the type mentioned above which is firstly easy to assemble and which secondly eliminates the need to provide retractable cores in the molds used for manufacturing the cassette housing and/or its cover, thereby reducing the cost of the molds and increasing the rate at which the molded parts can be manufactured.

SUMMARY OF THE INVENTION

According to the invention, the object is achieved by the facts that:

the flap is hinged to the cassette by means of two stubs which are in alignment and parallel with one of the edges of the flap, the stubs being formed to project out from respective side edges of the flap in the vicinity of said edge with which they are parallel;

the cassette has a through slot close to its longitudinal edge enabling the flap to be assembled to the cassette from the rear face of the cassette, the width of the slot being not less than the thickness of the flap and the length of the slot being not less than the distance between the opposite side edges of the flap carrying the said stubs, each of the ends of the slot adjacent to the sides of the flap including a hollow which is open towards the rear face of the cassette and which is intended to form a half-bearing for a corresponding one of the stubs of said flap; and the cassette is provided with at least one bracket bearing against the edge of the flap close to the alignment of said stubs so as to hold said stubs in their respective half-bearings.

By virtue of this structure, the prior art bearing-forming cavity is replaced by the wall of the cassette against which the stub bears and by the bracket holding the flap in place. The molds for manufacturing the cassette and the flap no longer require retractable cores for forming cavities, and this means that the molds can be used at a higher rate, thereby reducing manufacturing costs. Further, the flap is easier to mount on the housing. The edge of the flap at a distance from the hinge axis is engaged in the slot from the rear face of the housing and the flap is caused to slide through said slot until the stubs come into abutment in the hollows. The housing can then be disposed horizontally with its rear face on top allowing the flap to fall through the slot. Thereafter the flap can be held in place merely by installing the, or each, bracket.

Advantageously, the bracket is constituted by a spring blade which exerts a force on the flap urging it towards the front face of the cassette. This disposition prevents the flap from rattling when the cassette is subjected to vibration.

Advantageously, the flap includes at least one transverse moving stop element adjacent to the alignment of said stubs and constituted by a V-shaped tab having two flats, with the bracket co-operating with said moving stop element and constituting the fixed stop element of a stop device. This structure reduces the manufacturing cost of the cassette.

Advantageously, the bracket is U-shaped, having one end branch received in a cavity formed in the cassette and opening out to the rear face thereof, and having its other end branch cantilevered out from the first and co-operating with the moving stop element.

Preferably, the cassette includes two brackets disposed in the vicinity of the side edges of the flap.

Advantageously, the hollow has a semicircular groove matching the corresponding stub, with the wall of the groove being extended by two plane walls which flare slightly towards the rear face of the cassette. The groove acts as a half-bearing for the corresponding stub and the flared shape of the hollow facilitates flap insertion during assembly, with the stubs being guided by the plane walls.

Preferably, the cassette includes a side wall facing the end of each stub. This side walls increases the stiffness of the cassette.

BRIEF DESCRIPTION OF THE DRAWINGS

Embodiments of the invention are described by way of example with reference to the accompanying drawings, in which:

FIG. 5 is a section on the same larger scale on line VI—VI of FIG. 2 through the vicinity of the cassette pivot axis with the flap shown in its closed position;

FIG. 6 is a section similar to FIG. 5 showing the flap in its open position; and FIG. 7 shows how a stub is received in a hollow.

DETAILED DESCRIPTION

Figure 1A:
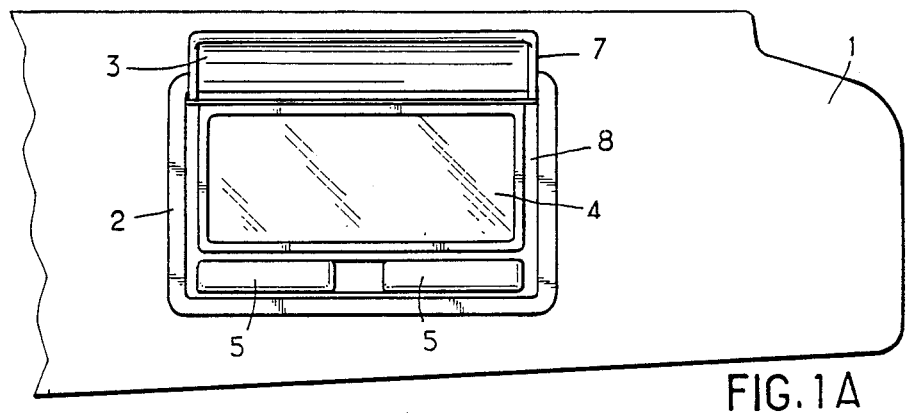
FIG. 1A shows a sun visor with a vanity mirror cassette whose flap is raised.
Figure 1B:
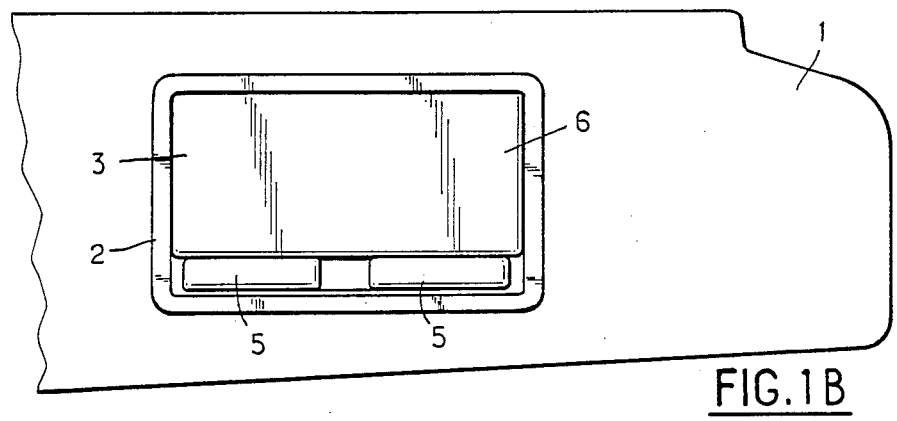
FIG. 1B shows a sun visor with a mirror cassette which is closed by its flap.

FIG. 1A shows a vanity mirror cassette 2 fitted in a sun visor 1. The cassette 2 contains a mirror 4 and has a pivoting flap 3 for covering the mirror. The flap is shown in its open position in FIG. 1A. The cassette 2 may optionally also contain lighting means 5, e.g. small bulbs covered by a strip of frosted glass. FIG. 1B shows the sun visor 1 with the flap 3 of the cassette 2 in its closed position. The flap 3 has an outside face 6 which is plane or slightly curved and has a rim 7 around its inside face which is received in a rectangular-shaped groove provided close to the periphery of the front face 9 of the cassette 2 when the flap 3 is closed. The flap 3 is mounted to pivot about a pivot axis 10 situated in the vicinity of the top longitudinal edge of the cassette 2 in the portion corresponding to the groove 8.

Male hinge elements for connecting the flap 3 to the cassette 2 are constituted by two stubs 12 which are in alignment and parallel to the edge 21 of the flap 3 in the vicinity of the longitudinal top edge of the cassette 2, said stubs being formed on respective side edges 11 of the flap 3 extending perpendicularly to the edge 21. The stubs 12 are close to the edge 21 and they project out from the flap 3. They are received at least partially in recesses provided in opposite edges 13 of the cassette and opening out into the groove, thereby constituting half-bearings.

Figure 2:
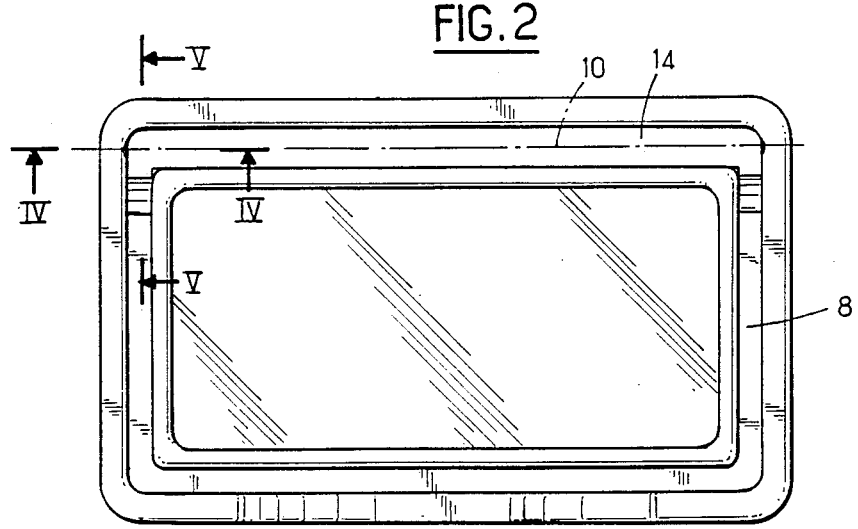
FIG. 2 is a front view of a second mirror cassette without its flap.
Figure 3:
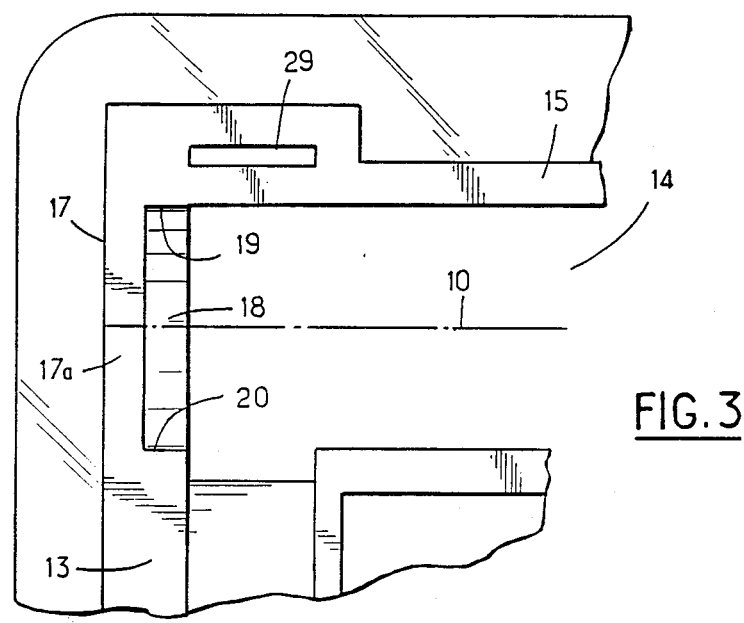
FIG. 3 is a view on a larger scale of one of the corners of the rear face of a mirror cassette without its flap.
Figure 4:
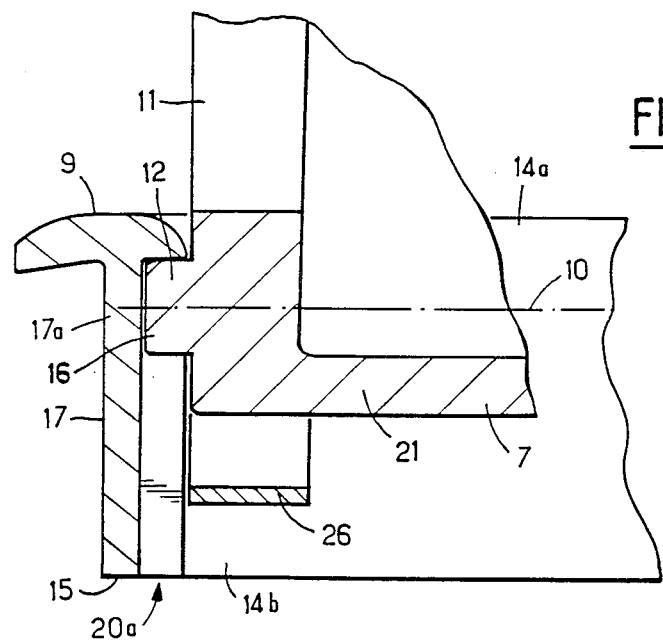
FIG. 4 is a section on the same larger scale on line VI—VI of FIGS. 2 and 6, showing the vicinity of the pivot axis with the flap in the open position.

FIG. 2 is a view of the front face of a cassette 2 which does not have lighting means 5, and which is shown with its flap 3 omitted. As can be seen in this figure and in the following figures, the cassette 2 has a slot 14 in the vicinity of the pivot axis 10, with the width of the slot 14 being not less than the thickness of the flap 3. The slot 14 opens out in the front face 9 of the cassette 2 via an orifice 14a which is at least as long as the length of the flap 3 between its two stubs 12, and it opens out in the rear face 15 of the cassette via an orifice 14b whose length is not less than the distance between the free ends 16 of the two stubs 12.

The slot 14 may be open facing the ends 16 or the stubs 12 and adjacent to the side faces 17 of the cassette 2 (FIG. 7), but the side faces 17 are preferably closed relative to the ends 16 of the stubs 12 by walls 17a which reinforce the stiffness of the cassette 2.

The recess for each stub 12 is constituted by a semicylindrical groove 18 delimited by the wall 18a of the corresponding edge 13 of the cassette 2 situated adjacent to the stub 12, and on the same side of the pivot axis 10 as the front face 9 of the cassette 2. This semicylindrical groove 18 opens towards the rear face 15 of the cassette 2 via two plane walls 19 and 20 which extend the wall 18a, which delimit the end portion of the slot 14, and which flare slightly towards the rear face 15. In this way, the slot 14 has a hollow 20a in each of its zones adjacent to the stubs 12, with the hollows 20a opening out to the rear face 15 of the cassette 2 via the orifices 14b.

The flap 3 is assembled to the cassette 2 by inserting its edge furthest from the stubs 12 into the orifice 14b from the rear face 15 of the cassette 2 and then causing it to slide through the slot 14 until the stubs 12 are received in their respective grooves 18.

As can be seen in FIGS. 5 and 6, the edge 21 of the flap 3 adjacent to the pivot axis 10 includes a V-shaped tab 22 on the adjacent rim 7, the tab having two flats 23 and 24, one or other of which, depending on the open or closed position of the flap 3, comes into contact with a cantilevered branch 25 of a spring blade 26 constituting a U-shaped spring, with the opposite end 27 of the spring blade 26 being fixed in a cavity 29 provided in the wall of the cassette 22 close to the pivot axis 10 and opening out to the rear face 15, the spring being held in the cavity 29 by snap-fastening means. The spring blade 26 thus forms a bracket which holds the stubs 12 of the flap 3 in their respective grooves 18. The spring blade 26 exerts a force on the flap 3 via the flats 23 or 24 directed towards the front face 9 of the cassette 2, thereby preventing the flap 3 from vibrating or rattling when the vehicle goes over bumpy ground.

The spring blade 26 co-operates with the flats 23 or 24 to constitute a device for holding the flap 3 in its open position or its closed position with the cantilevered branch 25 of the spring blade 26 forming the fixed stop element and with the tab 22 in combination with its flats 23 and 24 forming the stop element that moves with the flap 3.

Two stop devices are preferably provided, each being disposed adjacent to a corresponding one of the side edges 11 of the flap 3.

In the embodiment described above, the spring blade 26 constitutes both the fixed stop element and the bracket for holding the flap 3 against the cassette 2 and preventing the flap 3 from escaping. Naturally, the flap 3 could be held about its pivot axis 10 by means of a bracket independent from a stop device fixed on the cassette 2 in the vicinity of the pivot axis 10 and close to the rear face 15 of the cassette. Such a bracket could be disposed in the vicinity of one of the stubs 12 or in the vicinity of the edge 21 of the flap 3.

I claim:

1. A mirror cassette for a sun visor, the cassette comprising a flap which is hinged to the cassette in such a manner as to be capable of pivoting between a closed position in which the flap covers the mirror, and an open position in which the mirror is uncovered, with the flap being locked in its open and closed positions by stop devices constituted by a fixed stop element formed on the cassette and a moving stop element that moves with the flap, wherein:

the flap is hinged to the cassette by means of two stubs which are in alignment and parallel with one of the edges of the flap, the stubs being formed to project out from respective side edges of the flap in the vicinity of said edge with which they are parallel;

the cassette has a through slot close to its longitudinal edge enabling the flap to be assembled to the cassette from the rear face of the cassette, the width of the slot being not less than the thickness of the flap and the length of the slot being not less than the distance between the opposite side edges of the flap carrying the said stubs, each of the ends of the slot adjacent to the sides of the flap including a hollow which is open towards the rear face of the cassette and which is intended to form a half-bearing for a corresponding one of the stubs of said flap; and the cassette is provided with at least one bracket bearing against the edge of the flap close to the alignment of said stubs so as to hold said stubs in their respective half-bearings.

2. A cassette according to claim 1, wherein the bracket is constituted by a spring blade which exerts a force on the flap urging it towards the front face of the cassette.

3. A cassette according to claim 2, wherein the flap includes at least one transverse moving stop element adjacent to the alignment of said stubs and constituted by a V-shaped tab having two flats, with the bracket co-operating with said moving stop element and constituting the fixed stop element of a stop device.

4. A cassette according to claim 3, wherein the bracket is U-shaped, having one end branch received in a cavity formed in the cassette and opening out to the rear face thereof, and having its other end branch cantilevered out from the first and co-operating with the moving stop element.

5. A cassette according to claim 1, including two brackets disposed in the vicinity of respective ones of the side edges of the flap carrying said stubs.

6. A cassette according to claim 1, wherein the hollow has a semicircular groove matching the corresponding stub with the wall of the groove being extended by two plane walls which flare slightly towards the rear face of the cassette.

7. A cassette according to claim 1, including a side wall facing the end of each stub.

* * * * *